E. E. THOMAS.
RESILIENT WHEEL RIM.
APPLICATION FILED JULY 5, 1913.
1,205,819.
Patented Nov. 21, 1916.
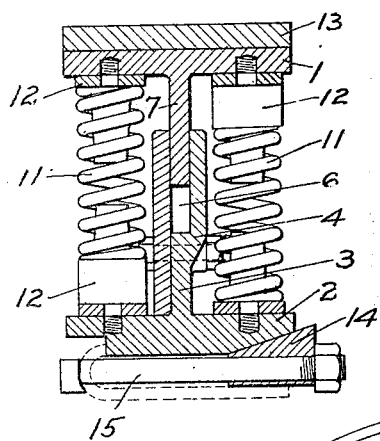
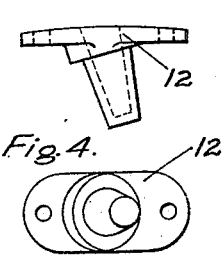
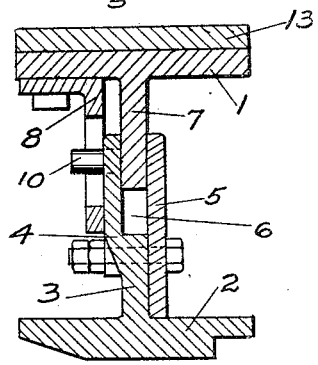
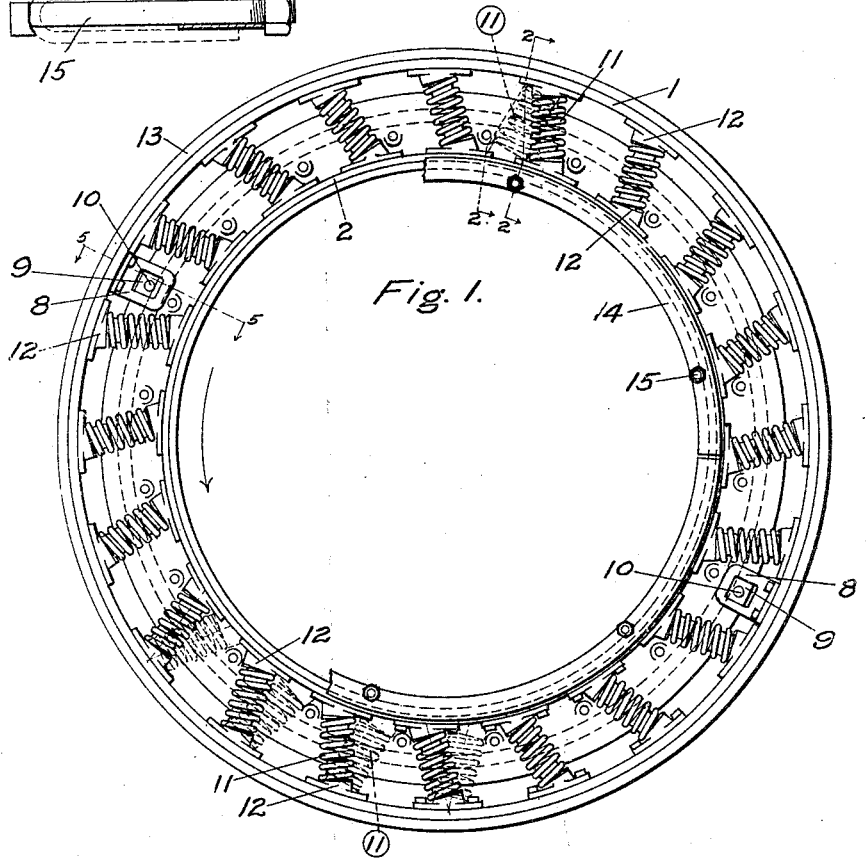

UNITED STATES PATENT OFFICE.

EDWIN E. THOMAS, OF PORTLAND, OREGON, ASSIGNOR TO HARRY O. TENNEY, OF PORTLAND, OREGON.

RESILIENT WHEEL-RIM.

1,205,819.  Specification of Letters Patent.  Patented Nov. 21, 1916.

Application filed July 5, 1913. Serial No. 777,486.

*To all whom it may concern:*

Be it known that I, EDWIN E. THOMAS, a citizen of the United States, residing in the city of Portland, county of Multnomah, and State of Oregon, have invented certain new and useful Improvements in Resilient Wheel-Rims, of which the following is a specification.

My invention relates to resilient wheel rims, and more particularly to a rim adapted to be placed upon a wheel of an automobile, auto-truck, or other vehicle, preferably in the same manner that a pneumatic or other tire with a demountable rim is put upon a wheel.

Among the salient objects of the invention are,—to provide a wheel rim of mechanical construction, as distinguished from a pneumatic construction, and which is capable of affording great resiliency and of effectively absorbing the vibrations caused by the unevenness of the surface over which the wheel runs; to provide a wheel rim which is complete in itself and which can be readily substituted for the tires and tire rims now in common use; to provide a wheel rim which is easy to repair and in which the substitution of new parts is made very easy; and, in general, to provide a simple, practical and efficient wheel rim of the character referred to.

In order that others may fully understand my invention, I have shown in the accompanying sheet of drawings, one practical embodiment thereof, which I will now describe:

In the drawings: Figure 1 is a side elevation of a wheel rim embodying my invention with a portion broken away; Fig. 2 is a cross sectional view thereof taken on lines 2—2 of Fig. 1, Figs. 3 and 4 are side and top views of an anchor plug or core for holding the springs in operating positions; and Fig. 5 is a cross sectional view taken on line 5—5 of Fig. 1, showing a stop for limiting the relative movements of the two rim members of the invention.

Referring now to the drawings, 1 and 2 designate outer and inner rim members, respectively, arranged one within the other at a space apart, as indicated. The inner rim is provided around its middle with a circumferentially extending web-like ring 3, standing edgewise or at right angles to the rim 2, and being offset slightly, as indicated at 4, with a detachable ring member 5, bolted thereto, as indicated, whereby to form a circumferentially extending channel 6. Rim 1 is also provided around its middle with a circumferentially extending ring 7, formed at right angles with the rim 1 and adapted to fit in the channel 6, and to move freely therein whenever there is any movement of said rims 1 and 2 relative to each other. There is also provided upon said outer rim 1, in the present form, at opposite sides thereof, two angle plates, as 8—8, having relatively large openings 9—9 therein, which fit over stop studs, as 10—10, in the sides of the ring 3, whereby to limit the movement of said rims circumferentially relatively to each other. Mounted on opposite sides of said interfitting ring members 3 and 7, and between the opposed rims 1 and 2, are coiled springs 11—11, arranged in pairs. The springs of each pair are arranged side by side, on opposite sides of the ring members 3 and 7, and are inclined in opposite directions relative to the radial and circumferential directions of the wheel; that is, said springs are disposed at an angle between the radial and the circumferential directions of the wheel or rim, as indicated by the full and dotted line positions of the springs on Fig. 1. In order to effectively hold said springs in these positions, around said rims, anchor studs or cores, 12—12, are provided, mounted upon the rim members at opposite sides of the ring portions 3 and 7 thereof, there being a pair of said anchor studs for each spring, so mounted that the studs or cores thereof are in alinement with each other when said rims are standing in their normal relative positions. These anchor members can be secured to the rims in any desired manner which will firmly hold them rigid with the rim and they can be distributed as may be deemed most practicable for the particular wheel or rim.

The object in having the springs angularly disposed with relation to the radial and circumferential directions of the wheel or rim will be readily understood, but may be stated as follows: The transmission of power or motion from the inner rim to the outer rim, when the wheel is in motion, assuming that the wheel or rim shown in Fig. 1 is to move toward the left, will be more direct and more effective with the springs standing in the angular positions shown in full lines, Fig. 1, than if said springs were standing in direct radial positions, for the tension of the springs will be more in alinement with the length of the spring and the spring will be compressed together instead of having a lateral strain applied at one end thereof. The springs in these positions, therefore, all perform a double function, that is, they control a radial yielding movement between the rims and also a relative circumferential movement therebetween. In the present showing, all of the springs on one side of the middle ring portions are inclined in the same direction, and all the springs on the opposite side of said ring members are inclined in the opposite direction. The distribution of the springs can be made to suit the case, as can also the number which are inclined in one direction and the number which are inclined in the opposite direction. The interfitting, or telescoping ring portions 3 and 7, prevent any lateral movement of one of said rims relative to the other, and at the same time permit of a free radial movement under the tension of the springs, and also of a slight circumferential movement, limited by the stops 8—8.

The inner rim can be adapted to any kind of a wheel rim desired, and can be adapted to be attached and detached in the same manner as is any of the demountable rims carrying tires. In the showing made, it is represented as applied to one of the well known wheel rims, shown in dotted lines, Fig. 2, and is clamped in place thereon by means of a wedge ring, as 14, and bolts, as 15, in a manner which will be well understood. The outer rim 1 can be provided with any desirable tire, rubber, metal, or fabric, as indicated at 13.

I am aware that changes can be made in the embodiment of the invention here shown for purposes of illustration without departing from the spirit of the invention, and I do not, therefore, limit the invention to the form here shown, except as I may be limited by the hereto appended claim.

I claim:

A resilient wheel rim of the character referred to, comprising in combination, outer and inner rims having upon their adjacent faces overlapping, circumferentially extending ring members occupying a plane within the plane of the wheel, with means for limiting the movement of said rim members toward and from each other, and means for limiting the movement of said rims relative to each other circumferentially, two series of anchor studs arranged in pairs around the adjacent faces of said rim members at opposite sides of said ring members, the anchor studs of each pair of one series at one side of said ring members being arranged in alinement with each other at one angle to the radial, and the studs of each pair of the other series at the opposite side of said ring members being arranged in alinement with each other at an angle to the radial opposite to the angle of the other studs, the angle from the radial being less than 45 degrees, whereby relative movements between said outer and inner rims are opposed by compression action only of said coiled springs, substantially as shown and described.

Signed at Portland, Oregon, this 23rd day of June, 1913.

EDWIN E. THOMAS.

In presence of—
G. A. NICHOLS,
OMAR L. DAY.